United States Patent [19]

Kazecki

[11] Patent Number: 5,365,549
[45] Date of Patent: Nov. 15, 1994

[54] COMPLEX SIGNAL CORRELATOR AND METHOD THEREFOR

[75] Inventor: Henry L. Kazecki, Arlington Heights, Ill.

[73] Assignee: Motorola, Inc., Schaumburg, Ill.

[21] Appl. No.: 65,421

[22] Filed: May 24, 1993

[51] Int. Cl.$^5$ .................. H03D 1/00; H04L 27/06
[52] U.S. Cl. .................. 375/96; 364/728.03
[58] Field of Search ............ 375/94, 96, 1, 12, 115; 364/728.03, 728.05; 370/18

[56] References Cited

U.S. PATENT DOCUMENTS

| | | | |
|---|---|---|---|
| 4,821,294 | 4/1989 | Thomas, Jr. | 375/96 |
| 5,276,706 | 1/1994 | Critchlon | 375/96 |

FOREIGN PATENT DOCUMENTS

91/07831  5/1991  WIPO .

*Primary Examiner*—Tesfalaet Bocure
*Attorney, Agent, or Firm*—Kevin D. Kaschke

[57] ABSTRACT

A complex signal correlator (106) and method therefor for correlating, at the multiple points in time, complex sampled (111) and reference (112) signals to produce a complex correlation signal (113). A relationship between the location of the reference signal (112) relative to the real and imaginary axes (301 and 302) is determined. The sampled signal (111) is processed responsive to the determined location, relative to the axes (301 and 302), of the reference signal (112) to produce real and imaginary processed components (210 and 211). The complex correlation signal (113) is produced responsive to adding (202–205) combinations of the real and imaginary processed components (210 and 211). Substituting adders (202–205) in the present invention for multipliers in the prior art complex signal correlators along with processing the sampled signal (111) significantly reduces the complexity of the complex signal correlator (106).

16 Claims, 4 Drawing Sheets

COMPLEX SIGNAL CORRELATOR

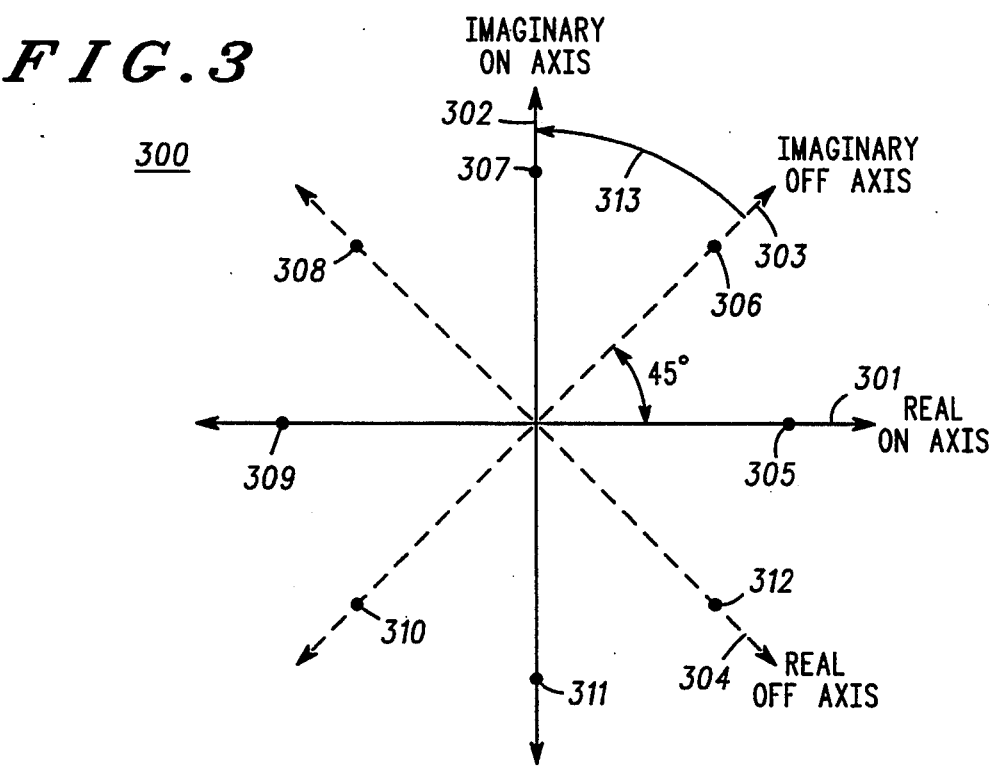

| | REFERENCE SIGNAL DETERMINED TO BE OFF AXIS $(s_r, s_i)$ | REFERENCE SIGNAL DETERMINED TO BE ON AXIS $(s_r, s_i)$ | EQUIVALENT COMPLEX SIGNAL CORRELATION $(s_r, s_i)*(rx_r, rx_i)$ | 1ST – 4TH PROCESSES ON THE I AND Q COMPONENTS OF THE SAMPLED SIGNAL |
|---|---|---|---|---|
| 306 308 | $(1/\sqrt{2}, 1/\sqrt{2})$ | (0,1) _307_ | $(-rx_i, rx_r)$ | INVERT POLARITY OF Q AND INTERCHANGE I AND Q VALUES |
| 310 | $(-1/\sqrt{2}, 1/\sqrt{2})$ | (-1,0) _309_ | $(-rx_r, -rx_i)$ | INVERT POLARITY OF I AND Q VALUES |
| 312 | $(-1\sqrt{2}, -1/\sqrt{2})$ | (0,-1) _311_ | $(rx_i, -rx_r)$ | INVERT POLARITY OF I AND INTERCHANGE I AND Q VALUES |
| | $(1/\sqrt{2}, -1/\sqrt{2})$ | (1,0) _305_ | $(rx_r, rx_i)$ | MAINTAIN I AND Q |

5,365,549

COMPLEX SIGNAL CORRELATOR AND METHOD THEREFOR

FIELD OF THE INVENTION

The present invention relates generally to communication systems and more particularly to a complex signal correlator and method therefor.

BACKGROUND OF THE INVENTION

The basic operation and structure of communication systems, such as cellular radio telephone systems communication systems and land mobile communication systems, are well known in the art. Communication systems typically comprise a plurality of communication units, a predetermined number of base stations (or repeaters) located throughout a geographic region and a controller. The communication units may be vehicle mounted or portable units. The communication units and the base stations each comprise either a transmitter or a receiver or both to form a transceiver. The communication units are coupled to the base stations by a communication channel over which modulated signals, such as radio frequency (RF) signals, are transmitted and/or received. The controller comprises a centralized call processing unit or a network of distributed controllers working together to establish communication paths for the communication units in the communication system.

More particularly, a receiver of the communication unit receives a modulated signal subsequent to transmission thereof by a transmitter of the base station on the communication channel. The receiver includes, inter alia, a downconvertor, a sampler, a memory unit, a correlator and a detector. The downconvertor downconverts the modulated signal to produce a downconverted signal. The sampler samples the downconverted signal at multiple points in time to produce a sampled signal. The memory unit stores a reference signal. Both the modulated signal and the reference signal are complex signals represented by real and imaginary components defined by real and imaginary axes. The correlator correlates, at the multiple points in time, the sampled signal with the reference signal to produce a complex correlation signal. The complex correlation signal is used, inter alia, for synchronization, signal recovery and channel sounding.

A well known technique for correlating the complex sampled signal with the complex reference signal to produce a complex correlation signal is derived in the following equations EQ1–3.

$$\text{EQ 1:} \quad C_n = S(n) * Rx(n)$$

$$\text{EQ 2:} \quad C_n = \sum_{k=0}^{14} S(k) Rx(n-k)$$

Wherein $S(n)$ and $Rx(n)$ are defined by:
$$S(n) = s_r(n) + j s_i(n)$$

$$Rx(n) = rx_r(n) + j rx_i(n)$$

Expanding the real and imaginary components in EQ 2 results in:

$$\text{EQ 3:} \quad C_n = \sum_{k=0}^{14} (s_r(k) rx_r(n-k) - s_i(k) rx_i(n-k) + j(s_i(k) rx_r(n-k) + s_r(k) rx_i(n-k)))$$

Wherein $Rx(n)$ is the sampled signal, $S(n)$ is the reference signal signal, $C_n$ is the complex correlation signal and k is an index, from zero to fourteen, for example. Both the sampled and reference signals are complex signals having real and imaginary components. The correlation technique is typically performed by a finite impulse response filter in a hardware or software implementation. As shown in EQ 3, the complex correlation signal for each index has four multiply operations and two add operations. It is well known that implementing hardware to perform the multiply operations is parts intensive which is costly, space consuming and current drain sensitive. Likewise, implementing software to perform the multiply operations is instruction intensive which is current drain sensitive.

Therefore, there is a need for a complex signal correlator and method therefor of reduced complexity.

BRIEF DESCRIPTION OF THE DRAWINGS

A detailed description of the preferred embodiments of the present invention will be better understood when read with reference to the accompanying drawings in which:

FIG. 3 illustrates a complex signal constellation diagram used by the processor of FIG. 2 in accordance with the present invention;

FIG. 4 illustrates a table of predetermined processor operations used by the processor of FIG. 2 in accordance with the present invention.

DETAILED DESCRIPTION OF A PREFERRED EMBODIMENT

Generally, a receiver receives a modulated signal and includes a downconvertor, a sampler, a memory unit and a novel complex signal correlator. The downconvertor downconverts the modulated signal to produce a downconverted signal. The sampler samples the downconverted signal at multiple points in time to produce a sampled signal. The memory unit stores a reference signal therein. Both the modulated signal and the reference signal are complex signals represented by real and imaginary components having values and defined by real and imaginary axes.

Conceptually, the novel complex signal correlator and method therefor correlates, at the multiple points in time, the sampled signal with the reference signal to produce a complex correlation signal. A relationship between the location of the reference signal relative to the real and imaginary axes is determined. The sampled signal is processed responsive to the determined location, relative to the axes, of a corresponding reference signal in time to produce real and imaginary processed components. The complex correlation signal is produced responsive to adding combinations of the real and imaginary processed components. Substituting adders in the present invention for multipliers in the prior art complex signal correlators along with processing the sampled signal significantly reduces the complexity of the complex signal correlator.

The detailed description of the preferred embodiments of the present invention can be better understood when read with reference to the accompanying drawings illustrated in FIGS. 1-5.

Figure 1:
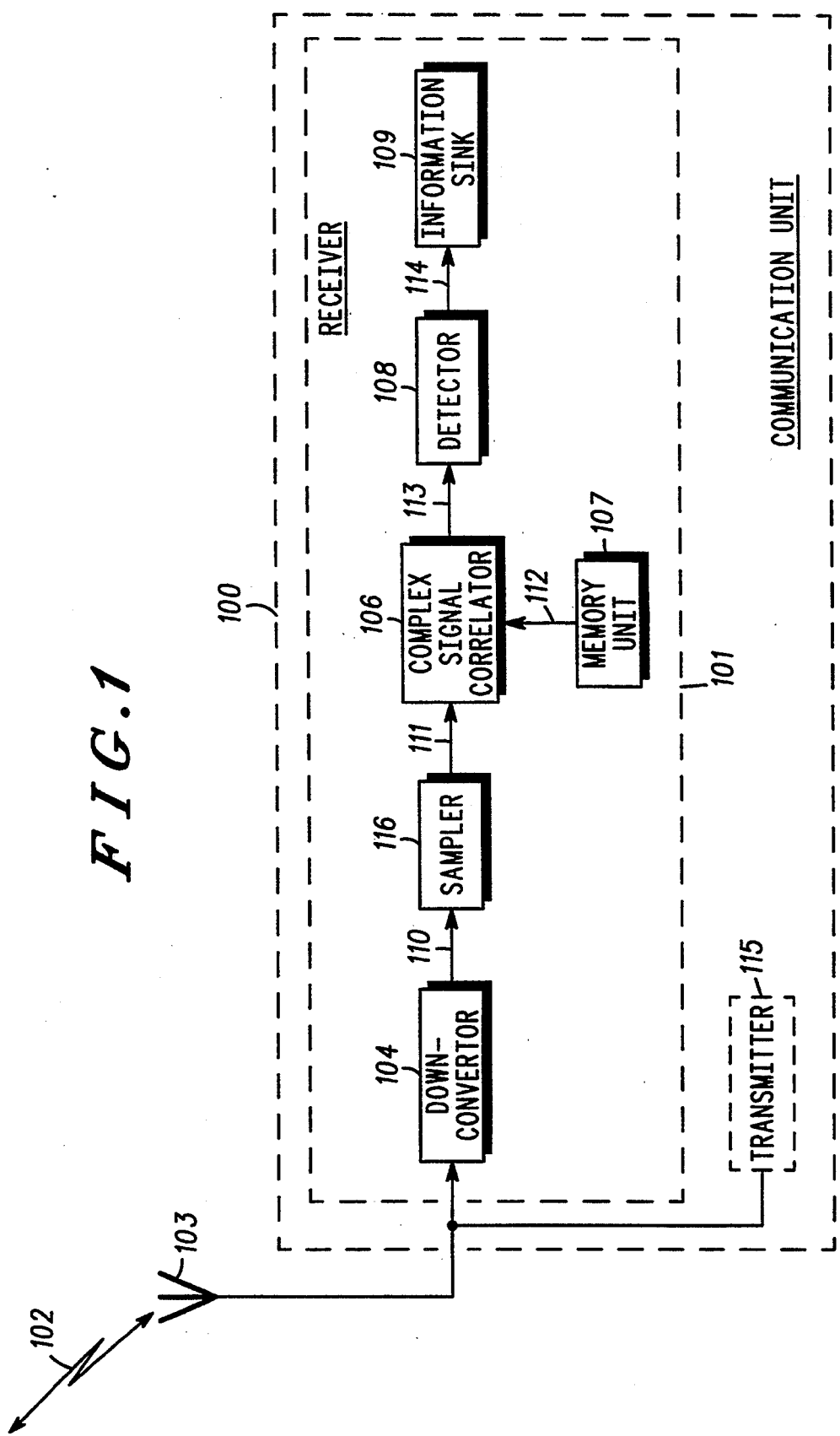
FIG. 1 illustrates a block diagram of a communication unit, including a complex signal correlator, in accordance with the present invention.

FIG. 1 illustrates a block diagram of a communication unit 100, including a complex signal correlator 106, in accordance with the present invention. The communication unit 100 generally includes, inter alia, a receiver 101 for receiving a modulated signal 102 via an antenna 103. The receiver 101 generally includes a downconvertor 104, a sampler 116, a novel complex signal correlator 106, a memory unit 107, a detector 108 and an information sink 109. Individually, the downconvertor 104, the sampler 116, the memory unit 107, the detector 108 and the information sink 109 are well known in the art and no further discussion will be presented except to facilitate the understanding of the present invention.

The downconvertor 104 is coupled to receive the modulated signal 102 and operative to downconvert the modulated signal 102 to produce a downconverted signal 110. The sampler 116 is coupled to receive the downconverted signal 110 and operative to sample the downconverted signal 110 at multiple points in time to produce a sampled signal 111. The memory unit 107 stores a reference signal 112 therein. Both the modulated signal 102 and the reference signal 112 are complex signals represented by real and imaginary components having values and defined by real and imaginary axes (described later in FIG. 3). The novel complex signal correlator 106 is coupled to receive the sampled signal 111 and the reference signal 112 and operative to correlate, at the multiple points in time, the sampled signal 111 with the reference signal 112 to produce a complex correlation signal 113. The detector 108 is coupled to receive the complex correlation signal 113 and operative to produce a detected signal 114 responsive to the real and imaginary components of the complex correlation signal 113. The detected signal 114 is coupled to the information sink 109 providing information for use by the receiver 101.

In the preferred embodiment of the present invention, the communication unit 100 includes the receiver 101 and the transmitter 115 to form a transceiver. The transmitter 115 is not critical to the invention and may be an optional element in communication units depending on the application. The transceiver 100 is a cellular radio telephone operating in the full duplex mode, such a Motorola MicroTac TM portable radio telephone, permitting the user to communicate over radio frequency communication channels. The radio frequency band of operation is typically 825-845 MHz for the receive band and 870-890 MHz for the transmit band. The modulated signal 102 is a $\pi/4$ DQPSK (differential quadrature phase shift keying) signal. The downconvertor 104 is of the superhetrodyne type commonly used for radio communications. The sampler 116 is an analog-to-digital convertor, for example Motorola DSP56ADC16. The sampling rate for the sampler 116 is designed to be at least two times the highest frequency component of the downconverted signal 110. For example, in a US Digital Cellular radio telephone having a digital modulation signal represented by $\pi/4$ DQPSK modulation the sampling rate is at least 48.6 kHz. The detector 108 is implemented in a digital signal processor, such as a Motorola DSP56000 to process the complex correlation signal 113 and to provide the detected signal 114 for use by the information sink 109. The information sink 109 is a conventional audible output speaker.

Figure 2:
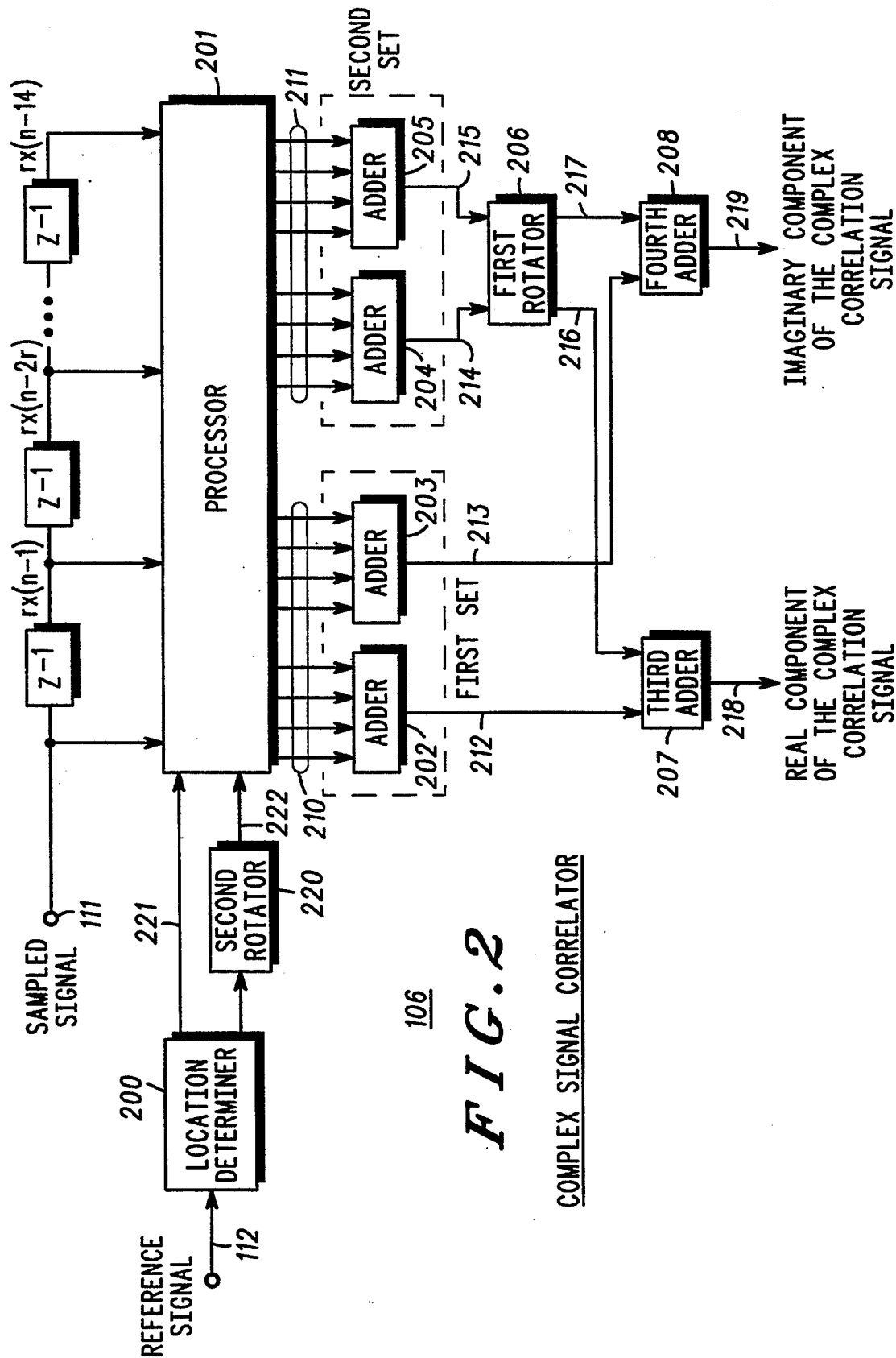
FIG. 2 illustrates a block diagram of the complex signal correlator, including a processor and adders, as shown in the communication unit of FIG. 1 in accordance with the present invention.

FIG. 2 illustrates a block diagram of the complex signal correlator 106, including a processor and adders, as shown in the communication unit 100 of FIG. 1 in accordance with the present invention. The complex signal correlator 106 generally includes a location determiner 200, a processor 201, first and second rotators 206 and 220, a first set of adders 202 and 203, a second set of adders 204 and 205, a third adder 207 and a fourth adder 208. Individually, the location determiner 200, the first and second rotators 206 and 220, the first set of adder 202 and 203, the second set of adders 204 and 205, the third adder 207 and the fourth adder 208 are well known in the art and no further discussion will be presented except to facilitate the understanding of the present invention.

The location determiner 200 is coupled to receive the reference signal 112 and operative to determine the location of the reference signal 112 relative to the real and imaginary axes 301 and 302 (in FIG. 3). The second rotator 220 is coupled to receive the reference signal 112 determined to be located off the axes 301 and 302 (in FIG. 3) and operative to rotate the reference signal 112 determined to be located off the axes 301 and 302 (in FIG. 3) to a location on the axes 301 and 302 (in FIG. 3). The determined location of the reference signal 112 is coupled to the processor 201 at lines 221 and 222.

The processor 201 is coupled to receive the determined location of the reference signal at line 221 and 222 and processes the real and imaginary components of the sampled signal 111 responsive to the location, relative to the axes 301 and 302 (in FIG. 3), of a corresponding reference signal 112 in time to produce real and imaginary on 210 and off 211 axis components of the sampled signal 111. The real and imaginary on axis components 210 correspond to the reference signal 112 in time determined to be located on the axes 301 and 302 (in FIG. 3). The real and imaginary off axis components 211 correspond to the reference signal 112 in time determined to be located off the axes 301 and 302 (in FIG. 3).

The first set of adders 202 and 203 are coupled to receive the real and imaginary on axis components 210 of the sampled signal 111 and operative to add the real and imaginary on axis components 210 of the sampled signal 111 to produce first real 212 and imaginary 213 components, respectively.

The second set of adders 204 and 205 are coupled to receive the real and imaginary off axis components 211 of the sampled signal 111 and operative to add the real and imaginary off axis components 211 of the sampled signal 111 to produce second real 214 and imaginary 215 components, respectively.

The first rotator 206 is coupled to receive the second real and imaginary signals 214 and 215 and operative to rotate the second real and imaginary signals 214 and 215 to a location off the axes to produce rotated real and imaginary signals 216 and 217, respectively.

The third adder 207 is coupled to receive the first real 212 and rotated real 216 signals and operative to add the first real 212 and rotated real 216 signals to produce a real component 218 of the complex correlated signal 113.

The fourth adder 208 is coupled to receive the first imaginary 213 and rotated imaginary 215 signals and operative to add the first imaginary 213 and rotated imaginary signals 215 to produce an imaginary component 219 of the complex correlated signal 113.

In the preferred embodiment of the present invention, the location determiner 200 is implemented with a conventional comparator that compares values of the real and imaginary components of the reference signal 112 to determine its location relative to the real and imaginary axes 301 and 302 (in FIG. 3). The processor 201 is implemented as software in a conventional signal processor or as hardware using conventional logic circuits. The first and second rotators 206 and 220 are implemented with a conventional complex phase shifter to shift the phase of the reference signal 112. The first set of adders 202 and 203, the second set of adders 204 and 205, the third adder 207 and the fourth adder 208 are implemented as conventional logic gates to perform the adding operation.

The present invention advantageously substitutes the first set of adders 202 and 203 and the second set of adders 204 and 205 for the four multipliers needed in the prior art complex signal correlators as shown in EQ 3. This substitution significantly reduces the complexity of the complex signal correlator 106 of the present invention over prior art complex signal correlaters. The significant complexity reduction results in a lower parts count which reduces cost, space and current drain of the complex signal correlator. For example, in an integrated circuit hardware implementation using logic gates as parts to implement arithmetic operations, an 8-bit multiplier can typically be implemented with 48 adders. Therefore, prior art complex signal correlaters need 2880 adders (48 adders/multiplier×4 multipliers×15 index). The present invention, however needs only 4 adders 202–205. This represents a 99% reduction in parts count.

FIG. 3 illustrates a complex signal constellation diagram 300 used by the processor 201 of FIG. 2 in accordance with the present invention. FIG. 3 generally illustrates real 301 and imaginary 302 on axes, real 304 and imaginary 303 off axes, and eight complex signal constellation points 305–312. The complex signal constellation diagram 300 is well known in the art and and no further discussion will be presented except to facilitate the understanding of the present invention. The modulated signal 102 and the reference signal 112 are complex signals represented by real and imaginary components having values and defined by real and imaginary axes 301 and 302. Constellation points 305, 307, 309, 311 are located on the on axes 301 and 302 and constellation points 306, 308, 310,312 are located off the axes 301 and 302. The second rotator 220 is operative to rotate the reference signal 112 located at a particular constellation point 305–312 to the nearest axis 301 or 302.

In the preferred embodiment of the present invention, eight constellation points having unity amplitude are used. However, in other applications, utilizing other modulation schemes, such as quadrature amplitude modulation, having multiple phase and amplitudes, may advantageously use the present invention. For multiple phases, additional rotators are needed for rotating the reference signal 112. For multiple amplitudes, gain stages are needed at the outputs of the first 202 and 203 and second set 204 and 205 of adders.

In the preferred embodiment of the present invention, the direction is in a counterclockwise direction 313 as shown in FIG. 3, but a clockwise rotation may also be used instead. The rotation of the off axis reference signal 112 to the nearest on axis location simplifies the processes described in FIG. 4.

FIG. 4 illustrates a table of processes used by the processor 201 of FIG. 2 in accordance with the present invention. FIG. 4 includes off axis constellation points 306, 308, 310 and 312 in a first column, on axis constellation points 305, 307, 309 and 311 in a second column, equivalent complex signal constellation result in column three and four processes performed on the real (I) and imaginary (Q) components of the sampled signal in column four.

The processor performs one of the four processes depending on the location of the reference signal 112 relative to the axes 301 and 302. When the corresponding reference signal 112 in time is located at or rotated to a constellation point on a positive portion of the imaginary axis 302, the processor 201 inverts the polarity of the imaginary component of the sampled signal 111 and interchanges the values of the real and imaginary components. When the corresponding reference signal in time is located at or rotated to a constellation point on a negative portion of the imaginary axis 302, the processor 201 inverts the polarity of the real component of the sampled signal and interchanges the values of real and imaginary components. When the corresponding reference signal in time is located at or rotated to a constellation point on a positive portion of the real axis 301 the processor 201 maintains the sampled signal 111. When the corresponding reference signal in time is located at or rotated to a constellation point on a negative portion of the real axis 301 the processor 201 inverts the polarity of both the real and imaginary components of the sampled signal.

Figure 5:
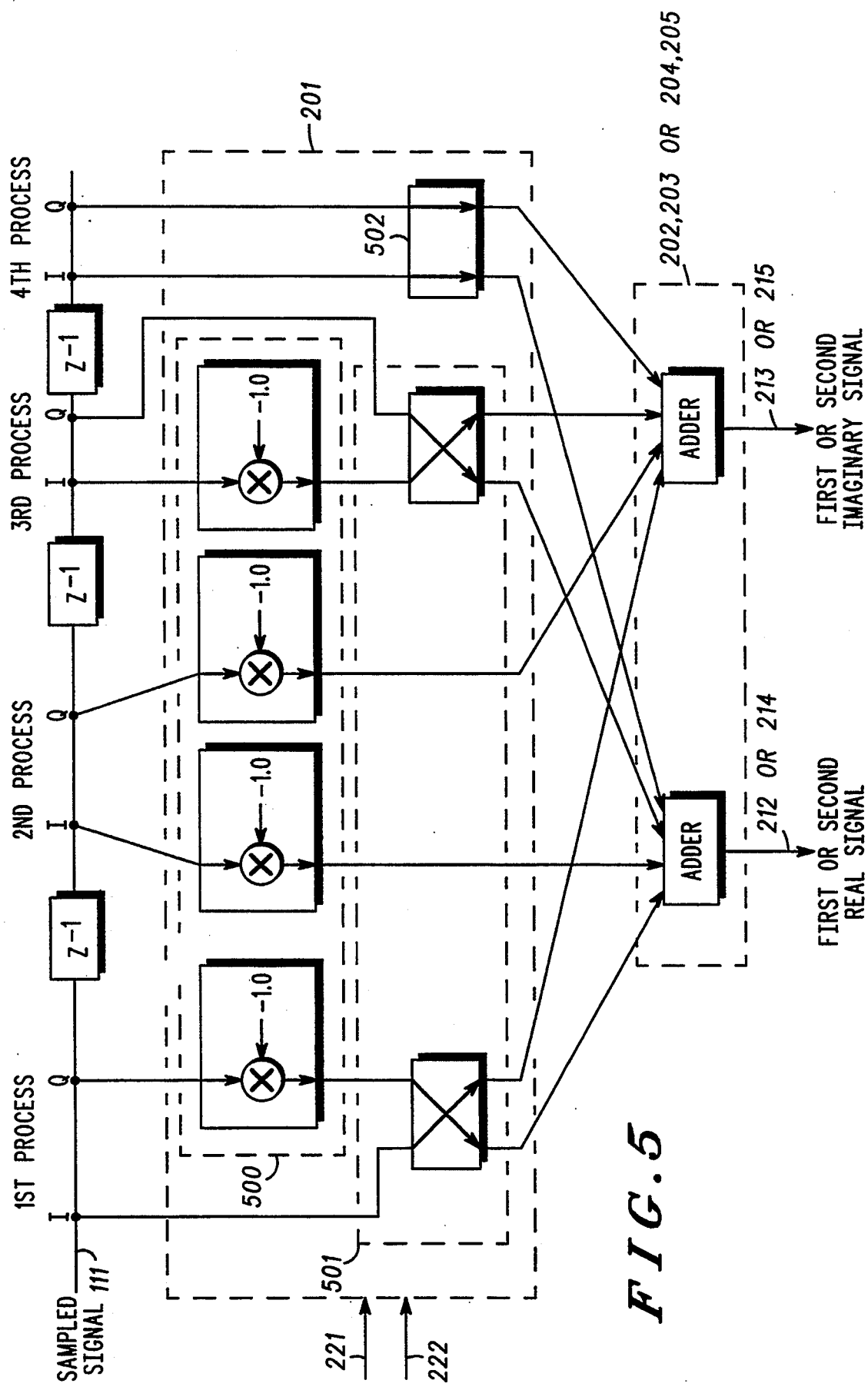
FIG. 5 illustrates a block diagram of the processor and adders as shown in the complex signal correlator of FIG. 2 in accordance with the present invention.

FIG. 5 illustrates a block diagram of the processor 201 and adders 202, 203 or 204 and 205 as shown in the complex signal correlator 106 of FIG. 2 in accordance with the present invention. The processor 201 performs the processing steps on the sampled signal 111 as described in the fourth column of FIG. 4. For simplicity only the four processes are represented to illustrate the present invention. During the actual complex signal correlation operation, only one process is performed on each portion of the sampled signal in time. The processor 201 generally includes a polarity invertor 500, an interchanger 501, a maintainer 502. Individually, the polarity invertor 500, the interchanger 501, and the maintainer 502 are well known in the art and no further discussion will be presented except to facilitate the understanding of the present invention.

The polarity invertor 500 is coupled to the sampled signal 111 and operative to invert the polarity of the imaginary component of the sampled signal 111 when the corresponding reference signal 112 in time is located at or rotated to a positive portion of the imaginary axis 302; to invert the polarity of the real component of the sampled signal 111 when the corresponding reference signal 112 in time is located at or rotated to a negative portion of the imaginary axis 302; and to invert the polarity of both the real and imaginary components of the sampled signal 111 when the corresponding reference signal 112 in time is located at or rotated to a negative portion of the real axis 301.

The interchanger 501 is coupled to the sampled signal 111 and operative to interchange the values of the real and imaginary components when the corresponding reference signal 112 in time is located at or rotated to a positive portion of the imaginary axis 302, and to interchange the values of the real and imaginary components when the corresponding reference signal 112 in time is located at or rotated to a negative portion of the imaginary axis 302.

The maintainer 502 is coupled to the sampled signal 111 and operative to maintain the sampled signal 111 when the corresponding reference signal 112 in time is located on a positive portion of the real axis 301.

In the preferred embodiment of the present invention the polarity invertor 500 is implemented by a a conventional invertor. The interchanger 501 is implemented by exchanging values between memory locations. The maintainer 502 is implemented by shorting the sampled signal 111 to the adders 202 and 203 or 204 and 205.

The novel complex signal correlator 106 and method therefor correlates, at the multiple points in time, the sampled signal with the reference signal to produce a complex correlation signal overcoming the problems of the prior art. This is accomplished by substituting four multipliers used by the prior art complex signal correlators with four adders 202-205 and processing the sampled signal 111. This substitution significantly reduces the complexity of the complex signal correlator 106 of the present invention over prior art complex signal correlators by approximately 99%. The significant complexity reduction results in a lower parts count which reduces cost, space and current drain of the complex signal correlator. The complexity reduction is accomplished by recognizing a relationship between the location of the reference signal relative to the real and imaginary axes and processing the sampled signal responsive to the determined location, relative to the axes, of a corresponding reference signal in time.

What is claimed is:

1. In a receiver that receives a modulated signal, wherein the receiver downconverts the modulated signal to produce a downconverted signal and samples the downconverted signal at multiple points in time to produce a sampled signal, and wherein the receiver includes a reference signal stored therein, wherein both the modulated signal and the reference signal are complex signals represented by real and imaginary components having values and defined by real and imaginary axes, a method for correlating, at the multiple points in time, the sampled signal with the reference signal to produce a complex correlation signal, comprising the steps of:

determining the location of the reference signal relative to the real and imaginary axes;

processing the real and imaginary components of the sampled signal responsive to the location, relative to the real and imaginary axes, of the reference signal to produce real and imaginary on and off axis components of the sampled signal, wherein the real and imaginary on axis components correspond to the reference signal in time determined to be located on the axes, and wherein the real and imaginary off axis components correspond to the reference signal in time determined to be located off the axes;

adding the real and imaginary on axis components of the sampled signal to produce first real and imaginary components, respectively;

adding the real and imaginary off axis components of the sampled signal to produce second real and imaginary components, respectively;

rotating the second real and imaginary signals to a location off the axes to produce rotated real and imaginary signals, respectively;

adding the first and rotated real signals to produce a real component of the complex correlated signal; and adding the first and rotated imaginary signals to produce an imaginary component of the complex correlation signal.

2. A method according to claim 1 further comprising rotating the reference signal determined to be located off the axes to a location on the axes.

3. A method according to claim 2 wherein the reference signal determined to be located off the axis is rotated counterclockwise to the nearest axis.

4. A method according to claim 1 wherein the step of processing further comprises the steps of:

when the reference signal is located on a positive portion of the imaginary axis:
inverting the polarity of the imaginary component of the sampled signal; and
interchanging the values of the real and imaginary components of the sampled signal;

when the reference signal is located on a negative portion of the imaginary axis:
inverting the polarity of the real component of the sampled signal; and
interchanging the values or real and imaginary components of the sampled signal;

when the reference signal is located on a positive portion of the real axis, maintaining the sampled signal; and when the reference signal is located on a negative portion of the real axis, inverting the polarity of both the real and imaginary components of the sampled signal.

5. In a receiver that receives a modulated signal, wherein the receiver includes a downconvertor, a sampler and a memory unit, wherein the downconvertor is coupled to receive the modulated signal and operative to downconvert the modulated signal to produce a downconverted signal, wherein the sampler is coupled to receive the downconverted signal and operative to sample the downconverted signal at multiple points in time to produce a sampled signal, wherein the memory unit stores a reference signal therein, wherein both the modulated signal and the reference signal are complex signals represented by real and imaginary components having values and defined by real and imaginary axes, a complex signal correlator coupled to receive the sampled signal and the reference signal and operative to correlate, at the multiple points in time, the sampled signal with the reference signal to produce a complex correlation signal, comprising:

a location determiner coupled to receive the reference signal and operative to determine the location of the reference signal relative to the real and imaginary axes;

a processor coupled to receive the determined location of the reference signal and the real and imaginary components of the sampled signal and operative to process the real and imaginary components of the sampled signal responsive to the location, relative to the real and imaginary axes, of the reference signal to produce real and imaginary on and off axis components of the sampled signal, wherein the real and imaginary on axis components correspond to the reference signal in time determined to be located on the axes, and wherein the real and imaginary off axis components correspond to the reference signal in time determined to be located off the axes;

a first set of adders coupled to receive the real and imaginary on axis components of the sampled signal and operative to add the real and imaginary on axis components of the sampled signal to produce first real and imaginary components, respectively;

a second set of adders coupled to receive the real and imaginary off axis components of the sampled signal and operative to add the real and imaginary off axis components of the sampled signal to produce second real and imaginary components, respectively;

a first rotator coupled to receive the second real and imaginary signals and operative to rotate the second real and imaginary signals to a location off the axes to produce rotated real and imaginary signals, respectively;

a third adder coupled to receive the first and rotated real signals and operative to add the first and rotated real signals to produce a real component of the complex correlated signal; and a fourth adder coupled to receive the first and rotated imaginary signals and operative to add the first and rotated imaginary signals to produce an imaginary component of the complex correlation signal.

6. A complex signal correlator according to claim 5 further comprising a second rotator coupled to receive the reference signal determined to be located off the axes and operative to rotate the reference signal determined to be located off the axes to a location on the axes.

7. A complex signal correlator according to claim 6 wherein the second rotator is operative to rotate the reference signal determined to be located off the axis counterclockwise to the nearest axis.

8. A complex signal correlator according to claim 5 wherein the processor further comprises:

a polarity inverter coupled to the sampled signal and operative to invert the polarity of the imaginary component of the sampled signal when the reference signal is located on a positive portion of the imaginary axis, to invert the polarity of the real component of the sampled signal when the reference signal is located on a negative portion of the imaginary axis, and to invert the polarity of both the real and imaginary components of the sampled signal when the reference signal is located on a negative portion of the real axis;

an interchanger coupled to the sampled signal and operative to interchange the values of the real and imaginary components of the sampled signal when the reference signal is located on a positive portion of the imaginary axis, and to interchange the values of the real and imaginary components of the sampled signal when the reference signal is located on a negative portion of the imaginary axis; and a maintainer coupled to the sampled signal and operative to maintain the sampled signal when the reference signal is located on a positive portion of the real axis.

9. In a communication unit including at least a receiver that receives a modulated signal has a reference signal stored therein, wherein both the modulated signal and the reference signal are complex signals represented by real and imaginary components having values and defined by real and imaginary axes, a method for using the communication unit comprising the steps of:

downconverting the modulated signal to produce a downconverted signal;

sampling the downconverted signal at multiple points in time to produce a sampled signal;

correlating, at the multiple points in time, the sampled signal with the reference signal to produce a complex correlation signal further comprising the steps of:

determining the location of the reference signal relative to the real and imaginary axes;

processing the real and imaginary components of the sampled signal responsive to the location, relative to the real and imaginary axes, of the reference signal to produce real and imaginary on and off axis components of the sampled signal, wherein the real and imaginary on axis components correspond to the reference signal in time determined to be located on the axes, and wherein the real and imaginary off axis components correspond to the reference signal in time determined to be located off the axes;

adding the real and imaginary on axis components of the sampled signal to produce first real and imaginary components, respectively;

adding the real and imaginary off axis components of the sampled signal to produce second real and imaginary components, respectively;

rotating the second real and imaginary signals to a location off the axes to produce rotated real and imaginary signals, respectively;

adding the first and rotated real signals to produce a real component of the complex correlated signal; and adding the first and rotated imaginary signals to produce an imaginary component of the complex correlation signal; and detecting the sampled signal responsive to the real and imaginary components of the complex correlation signal to produce a detected signal.

10. A method of using a communication unit according to claim 9 wherein the step of correlating further comprises the step of rotating the reference signal determined to be located off the axes to a location on the axes.

11. A mouthed of using a communication unit according to claim 10 wherein the reference signal determined to be located off the axis is rotated counterclockwise to the nearest axis.

12. A method of using a communication unit according to claim 9 wherein the step of processing further comprises the steps of:

when the reference signal is located on a positive portion of the imaginary axis:
inverting the polarity of the imaginary component of the sampled signal; and
interchanging the values or the real and imaginary components of the sampled signal;

when the reference signal is located on a negative portion of the imaginary axis:
inverting the polarity of the real component of the sampled signal; and
interchanging the values of real and imaginary components of the sampled signal;

when the reference signal is located on a positive portion of the real axis, maintaining the sampled signal; and when the reference signal is located on a negative portion of the real axis, inverting the polarity of both the real and imaginary components of the sampled signal.

13. In communication unit including at least a receiver that receives a modulated signal and a memory unit for storing a reference signal therein, wherein both the modulated signal and the reference signal are complex signals represented by real and imaginary components having values and defined by real and imaginary axes, the communication unit comprising:

downconvertor coupled to receive the modulated signal and operative to downconvert the modulated signal to produce a downconverted signal;

a sampler coupled to receive the downconverted signal and operative to sample the downconverted signal at multiple points in time to produce a sampled signal;

a complex signal correlator coupled to receive the sampled signal and the reference signal and operative to correlate, at the multiple points in time, the sampled signal with the reference signal to produce a complex correlation signal further comprising:

a location determiner coupled to receive the reference signal and operative to determine the location of the reference signal relative to the real and imaginary axes;

a processor coupled to receive the determined location of the reference signal and the real and imaginary components of the sampled signal and operative to process the real and imaginary components of the sampled signal responsive to the location, relative to the real and imaginary axes, of the reference signal to produce real and imaginary on and off axis components of the sampled signal, wherein the real and imaginary on axis components correspond to the reference signal in time determined to be located on the axes, and wherein the real and imaginary off axis components correspond to the reference signal in time determined to be located off the axes;

a first set of adders coupled to receive the real and imaginary on axis components of the sampled signal and operative to add the real and imaginary on axis components of the sampled signal to produce first real and imaginary components, respectively;

a second set of adders coupled to receive the real and imaginary off axis components of the sampled signal and operative to add the real and imaginary off axis components of the sampled signal to produce second real and imaginary components, respectively;

a first rotator coupled to receive the second real and imaginary signals and operative to rotate the second real and imaginary signals to a location off the axes to produce rotated real and imaginary signals, respectively;

a third adder coupled to receive the first and rotated real signals and operative to add the first and rotated real signals to produce a real component of the complex correlated signal; and a fourth adder coupled to receive the first and rotated imaginary signals and operative to add the first and rotated imaginary signals to produce an imaginary component of the complex correlation signal; and a detector coupled to receive the sampled signal and operative to produce a detected signal responsive to the real and imaginary components of the complex correlation signal.

14. A complex signal correlator according to claim 13 wherein the complex signal correlator further comprises a second rotator coupled to receive the reference signal determined to be located off the axes and operative to rotate the reference signal determined to be located off the axes to a location on the axes.

15. A complex signal correlator according to claim 14 wherein the rotator is operative to rotate the reference signal determined to be located off the axis counter-clockwise to the nearest axis.

16. A complex signal correlator according to claim 13 wherein the processor further comprises:

a polarity inverter coupled to the sampled signal and operative to invert the polarity of the imaginary component of the sampled signal when the reference signal is located on a positive portion of the imaginary axis, to invert the polarity of the real component of the sampled signal when the reference signal is located on a negative portion of the imaginary axis, and to invert the polarity of both the real and imaginary components of the sampled signal when the reference signal is located on a negative portion of the real axis;

an interchanger coupled to the sampled signal and operative to interchange the values of the real and imaginary components of the sampled signal when the reference signal is located on a positive portion of the imaginary axis, and to interchange the values of the real and imaginary components of the sampled signal when the reference signal is located on a negative portion of the imaginary axis; and a maintainer coupled to the sampled signal and operative to maintain the sampled signal when the reference signal is located on a positive portion of the real axis.

* * * * *